No. 725,417. PATENTED APR. 14, 1903.
J. G. DELANEY.
REVERSIBLE WINCH HEAD.
APPLICATION FILED MAR. 30, 1900.
NO MODEL.

WITNESSES:
F. Stallman
H. L. Reynolds.

INVENTOR
James G. Delaney
BY
Gifford & Bull
ATTORNEYS

UNITED STATES PATENT OFFICE.

JAMES G. DELANEY, OF NEW YORK, N. Y.

REVERSIBLE WINCH-HEAD.

SPECIFICATION forming part of Letters Patent No. 725,417, dated April 14, 1903.

Application filed March 30, 1900. Serial No. 10,739. (No model.)

*To all whom it may concern:*

Be it known that I, JAMES G. DELANEY, a citizen of the United States, and a resident of the city of New York, borough of Manhattan, in the county of New York and State of New York, (whose post-office address is 96 Liberty street, New York city,) have invented a new and Improved Reversible Winch-Head, of which the following is a full, clear, and exact description.

My invention relates to an improvement in devices for connecting a reversible winch-head with a non-reversible rotating member of a hoisting-engine or other apparatus, so that the winch-head may be reversed in direction.

My invention comprises novel features, which will be hereinafter particularly pointed out in the claims.

Reference is to be had to the accompanying drawings, forming a part of this specification, in which similar characters of reference indicate corresponding parts in both the figures.

The drawings are given merely as illustrative of the principles of my invention and of the particular construction now preferred by me.

Figure 1:
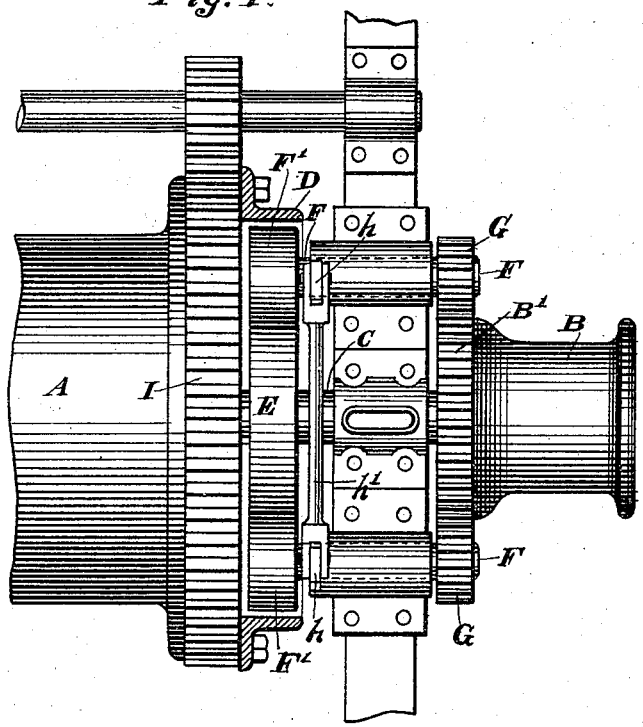
Figure 2:
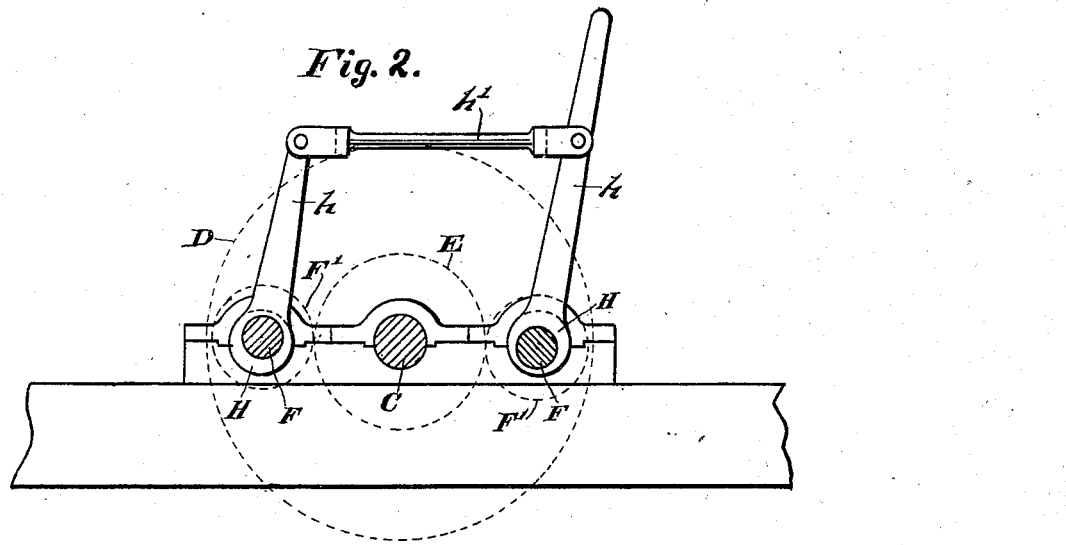

Figure 1 is a plan view of my device, showing the parts of a hoisting-engine which are immediately connected therewith; and Fig. 2 is an elevation showing diagrammatically the position of the various parts of the mechanism.

The following is a description of my invention as illustrated in the accompanying drawings.

In the drawings, A represents a drum of a hoisting-engine, which is so connected with the motor as to be revolved constantly in one direction. This drum is mounted upon a shaft C and may be secured to said shaft by a rigid connection or may be provided with friction devices to turn therewith, as desired.

I represents a gear-wheel which is secured to turn with the shaft or drum, as desired. This gear should in either case have a constant rotation in one direction. Connected to rotate with this gear are two friction members, one consisting of a disk E and the other of a ring D, the outer periphery of the disk being a friction-surface and the inner periphery of the ring being a friction-surface.

The winch-head B is mounted to turn freely upon the shaft C or a separate shaft which is in line therewith, preferably, however, upon the same shaft. This winch-head, as is usual with such devices, is supported from one end only, so that a rope may be readily thrown on or off without obstruction. This winch-head has the gear B' connected to or formed upon the inner end thereof, with which mesh pinions G, secured to the outer ends of auxiliary shafts F, which are suitably mounted in the frame of the machine. Upon the opposite ends of these auxiliary shafts are secured friction-disks F', which lie between the friction driving-disk E and the friction driving-ring D. The disks F' are slightly smaller than the space between the disk E and ring D, so that when in engagement with one they will clear the other.

It is evident that the relative position of the friction and toothed devices connecting the shaft and winch-head may be reversed—that is, the friction devices may be upon the winch and the toothed gears connected with the shaft. This is, however, a mere reversal of parts and within the scope of my invention.

The auxiliary shafts F are mounted in eccentric bearing-sleeves H, which are journaled upon the frame. These sleeves are disposed so that their eccentricities are opposite—that is, as shown in Fig. 2, the eccentricity of one sleeve is below the center of the shaft F, while the eccentricity of the other sleeve is above the center of its shaft F. Though I prefer the eccentrics just referred to, I am aware that it is possible to substitute equivalent mechanical elements therefor, and I therefore do not wish to be limited to the employment of eccentrics. Each of these sleeves is provided with an operating-arm $h$, said arms being connected to move together by means of a link $h'$ or any other suitable device. The teeth of the pinions G and the gear B' are so constructed that they will operate together satisfactorily even if the pinions be moved a slight distance toward or from the center of the gear B'. By turning the eccentric sleeves in the proper direction the shafts F and the friction-disks F', carried thereby, may be moved into engagement with either the friction-disk E or the friction-ring D. When in engagement with the disk E, the rotation of the winch-head B is in the same direction as that of the friction driving-disk E and the gear I. When in engagement with the friction-ring D, the direction of rotation of the winch-head B is opposite that of the friction driving-ring D and the gear I. By reason of the opposite location of the eccentricities of the two sleeves the friction-disks F' will be moved simultaneously either toward the friction-disk E or away from the same and into engagement with the friction-ring D. As shown in Fig. 2, one of the arms $h$ is provided with an extension forming a lever which may be engaged by the hand to turn the device. It is evident that this device may be operated from a distance by using suitable connecting mechanism. As the mechanism used for this purpose forms no essential part of my invention, I have not herein shown it.

It is also evident that one of the auxiliary shafts, with its friction disk and pinion, may be omitted without in the least affecting the principle of my invention. It is also obvious that more than two such shafts, with their disks and pinions, might be used. Increasing the number would, however, be but a duplication of parts. The chief advantage arising from using more than one such shaft lies in increasing the friction driving-surface.

While I have described my device as employed for driving a winch-head, it is evident that it may, if desired, be employed to drive an ordinary drum.

I am aware that many changes in construction may be made without departure from the principles of my invention and that many parts may be replaced by other and equivalent constructions or the relative location of parts may be reversed, as pointed out for the friction devices. Wherever such changes are possible I am to be understood as claiming such equivalent or reversed constructions whether their use has been particularly mentioned or not.

Having thus fully described my invention, I claim as new and desire to secure by Letters Patent—

1. The combination with a reversible winch-head, and a rotating driving member therefor, both having a common axis of rotation, of an auxiliary shaft having rotative connection with the winch-head, a friction-disk on said shaft, two friction driving members carried by the rotating driving member, and means for shifting the friction-disk into engagement with either of the friction driving members.

2. The combination with a reversible winch-head, and a rotating driving member therefor, both having a common axis of rotation, of an auxiliary shaft having rotative connection with the winch-head, a friction-disk on said shaft, two friction driving members carried by the rotating driving member, an eccentric sleeve surrounding said auxiliary shaft, and means for turning said sleeve to shift the friction-disk into engagement with either of the friction driving members.

3. The combination with a reversible winch-head, and a non-reversing driving member, of a reversible mechanism between the two comprising concentric friction-disk and friction-ring carried by said driving member, an auxiliary shaft having a gear connection with the winch-head, a friction-disk on said shaft and lying between said first-named friction-disk and the friction-ring, and means for moving the auxiliary shaft to engage its disk with either the other friction-disk or the friction-ring.

4. The combination with a reversible winch-head and a non-reversing driving member, of a reversible mechanism between the two comprising concentric friction-disk and friction-ring carried by said driving member, two auxiliary shafts having gear connections with the winch-head, a friction-disk on each shaft and lying on opposite sides of said first-named friction-disk and between it and the friction-ring, and means for moving the auxiliary shafts either toward or away from each other to engage their friction-disks either with the driving friction-disk or the friction-ring.

5. The combination with a reversible winch-head and a non-reversing driving member, of a reversible mechanism between the two comprising concentric friction-disk and friction-ring carried by said driving member, two auxiliary shafts having gear connections with the winch-head, a friction-disk on each shaft and lying on opposite sides of said first-named friction-disk and between it and the friction-ring, eccentric bearing-sleeves surrounding said shafts and having their eccentricities oppositely disposed, arms carried by said sleeves, and connections between said arms to move them together.

6. In a hoisting-engine the combination with a drum-shaft adapted to be rotated continuously in one direction, and a driving member turning therewith, of a drum mounted to turn upon said shaft, said driving member and the drum having, one, a toothed gear and the other a friction-gear secured thereto, and an auxiliary shaft having thereon a toothed pinion and a friction-pinion adapted to engage respectively with the toothed and friction gears to turn the drum.

7. In a hoisting-engine the combination with a drum-shaft adapted to be rotated continuously in one direction, and a driving member turning therewith, of a drum mounted to turn upon said shaft, said driving member and the drum having, one, a toothed gear and the other a friction-gear secured thereto, and an auxiliary shaft having thereon a toothed pinion and a friction-pinion adapted to engage respectively with the toothed and friction gears to turn the drum, and means for moving the friction-gears toward and from each other.

8. In a hoisting-engine the combination with a drum-shaft adapted to be rotated continuously in one direction and a driving member turning therewith, of a drum mounted to turn upon said shaft, said driving member and the drum having rotatively connected therewith, one, a gear and the other an internal and an external gear, and a shaft having two pinions one adapted to be engaged as desired with either the internal or the external gear to reverse the relative rotation thereof, and the other connected with the gear which is connected with the opposite member.

9. In a hoisting-engine, the combination with a drum-shaft, a drum mounted loosely thereon, and a reversible driving connection between said parts comprising inner and outer friction-surfaces concentric with the shaft and rotatively connected with one of said parts, a shaft substantially parallel with the drum-shaft, a friction-pinion lying between said friction-surfaces and adapted to be engaged with either, and rotative connection from said pinion-shaft to the other of said first-named parts.

10. The combination with the drum-shaft, a drum mounted loose on said shaft and a reversible driving connection between said parts comprising friction-surfaces rotatively connected with one of said parts, two shafts each having thereon a friction-pinion, oscillating members carrying bearings for said shaft and adapted to move them to engage and disengage the friction-pinions and the said friction-surfaces to reverse the final motion, a controlling connection insuring corresponding movement in both of said oscillating members, and a driving connection from the said shafts to the other of said first-mentioned parts.

11. The combination with the drum-shaft, a drum mounted loose on said shaft and a reversible driving connection between said parts comprising friction-surfaces rotatively connected with one of said parts, two shafts each having thereon a friction-pinion, oscillating members carrying bearings for said shaft and adapted to move them to engage and disengage the friction-pinions and the said friction-surfaces to reverse the final motion, and a link or equivalent device connecting said oscillating members to secure like motions therein.

In testimony whereof I have signed my name to this specification in the presence of two subscribing witnesses.

J. G. DELANEY.

Witnesses:
H. L. REYNOLDS,
CHAS. J. RATHJEN.